(12) United States Patent
Schwartz

(10) Patent No.: US 9,658,722 B2
(45) Date of Patent: May 23, 2017

(54) USING A PRINTED CIRCUIT TO OFFSET CHARGE DURING CAPACITIVE SENSING

(71) Applicant: Synaptics Incorporated, San Jose, CA (US)

(72) Inventor: Adam Schwartz, Redwood City, CA (US)

(73) Assignee: Synaptics Incorporated, San Jose, CA (US)

( * ) Notice: Subject to any disclaimer, the term of this patent is extended or adjusted under 35 U.S.C. 154(b) by 833 days.

(21) Appl. No.: 14/038,466

(22) Filed: Sep. 26, 2013

(65) Prior Publication Data

US 2015/0084876 A1 Mar. 26, 2015

(51) Int. Cl.
*G06F 3/041* (2006.01)
*G06F 3/044* (2006.01)

(52) U.S. Cl.
CPC ............ *G06F 3/044* (2013.01); *G06F 3/0418* (2013.01); *G06F 2203/04107* (2013.01)

(58) Field of Classification Search
CPC ........ G06F 2203/04107; G06F 3/041–3/04897
USPC ................. 324/658–690; 345/173–174, 178; 178/18.06; 349/12; 382/124
See application file for complete search history.

(56) References Cited

U.S. PATENT DOCUMENTS

| | | | | |
|---|---|---|---|---|
| 6,057,903 | A * | 5/2000 | Colgan ................. | G06F 3/0412 345/173 |
| 8,237,068 | B2 * | 8/2012 | Szaikowski ............ | G06F 3/044 345/174 |
| 8,395,395 | B2 | 3/2013 | Bruwer et al. | |
| 8,711,570 | B2 * | 4/2014 | Hotelling .............. | G06F 3/0412 174/254 |
| 8,901,944 | B2 * | 12/2014 | Chai ...................... | G06F 3/044 324/686 |
| 9,086,768 | B2 * | 7/2015 | Elias ...................... | G06F 3/044 345/173 |
| 2010/0292945 | A1 * | 11/2010 | Reynolds ............... | G06F 3/044 324/686 |
| 2012/0050206 | A1 | 3/2012 | Welland | |
| 2013/0016065 | A1 | 1/2013 | Reynolds et al. | |
| 2013/0113752 | A1 | 5/2013 | Chang et al. | |
| 2013/0181942 | A1 | 7/2013 | Bulea et al. | |
| 2013/0191804 | A1 | 7/2013 | Bytheway et al. | |

FOREIGN PATENT DOCUMENTS

EP 1894025 A1 3/2008

OTHER PUBLICATIONS

ISA/KR, International Search Report and Written Opinion for International Application # PCT/US2014/057769, pp. 1-12, mailed Jan. 8, 2015 (Jan. 8, 2015).

* cited by examiner

*Primary Examiner* — Melissa Koval
*Assistant Examiner* — Rahul Maini
(74) *Attorney, Agent, or Firm* — Osha Liang LLP

(57) ABSTRACT

In a method of capacitive sensing an absolute capacitive sensing signal is driven through at least one of a plurality of routing traces of a printed circuit. Absolute capacitive sensing is performed with at least one sensor electrode of a plurality of sensor electrodes in a sensor electrode pattern. The at least one sensor electrode is coupled with the at least one of the plurality of routing traces. An offsetting signal is transmitted on a parallel conductor overlapping the at least one of the plurality of routing traces, such that charge is offset from the at least one of the plurality of routing traces during the absolute capacitive sensing.

16 Claims, 11 Drawing Sheets

SECTION A-A

1100

```
┌─────────────────────────────────────────────────────┐
│  DRIVING AN ABSOLUTE CAPACITIVE SENSING SIGNAL       │
│  THROUGH AT LEAST ONE OF A PLURALITY OF ROUTING      │
│  TRACES OF A FLEXIBLE PRINTED CIRCUIT                │
│                    1110                              │
└─────────────────────────────────────────────────────┘
                         │
                         ▼
┌─────────────────────────────────────────────────────┐
│  PERFORMING ABSOLUTE CAPACITIVE SENSING WITH AT      │
│  LEAST ONE SENSOR ELECTRODE OF A PLURALITY OF        │
│  SENSOR ELECTRODES IN A SENSOR ELECTRODE PATTERN,    │
│  WHEREIN THE AT LEAST ONE SENSOR ELECTRODE IS        │
│  COUPLED WITH THE AT LEAST ONE OF THE PLURALITY      │
│  OF ROUTING TRACES                                   │
│                    1120                              │
└─────────────────────────────────────────────────────┘
                         │
                         ▼
┌─────────────────────────────────────────────────────┐
│  TRANSMITTING AN OFFSETTING SIGNAL ON A PARALLEL     │
│  CONDUCTOR OVERLAPPING THE AT LEAST ONE OF THE       │
│  PLURALITY OF ROUTING TRACES, SUCH THAT CHARGE IS    │
│  OFFSET FROM THE AT LEAST ONE OF THE PLURALITY OF    │
│  ROUTING TRACES DURING THE ABSOLUTE CAPACITIVE       │
│  SENSING                                             │
│                    1130                              │
└─────────────────────────────────────────────────────┘
```

FIG. 11A

USING A PRINTED CIRCUIT TO OFFSET CHARGE DURING CAPACITIVE SENSING

BACKGROUND

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones and tablet computers). Such touch screen input devices are typically superimposed upon or otherwise collocated with a display of the electronic system.

SUMMARY

In a method of capacitive sensing an absolute capacitive sensing signal is driven through at least one of a plurality of routing traces of a printed circuit. Absolute capacitive sensing is performed with at least one sensor electrode of a plurality of sensor electrodes in a sensor electrode pattern. The at least one sensor electrode is coupled with the at least one of the plurality of routing traces. An offsetting signal is transmitted on a parallel conductor overlapping the at least one of the plurality of routing traces, such that charge is offset from the at least one of the plurality of routing traces during the absolute capacitive sensing.

BRIEF DESCRIPTION OF DRAWINGS

The drawings referred to in this Brief Description of Drawings should not be understood as being drawn to scale unless specifically noted. The accompanying drawings, which are incorporated in and form a part of the Description of Embodiments, illustrate various embodiments and, together with the Description of Embodiments, serve to explain principles discussed below, where like designations denote like elements, and:

FIGS. 11A and 11B illustrate a method of capacitive sensing, according to various embodiments.

DESCRIPTION OF EMBODIMENTS

The following Description of Embodiments is merely provided by way of example and not of limitation. Furthermore, there is no intention to be bound by any expressed or implied theory presented in the preceding Background, Summary, or Brief Description of Drawings or the following Description of Embodiments.

Overview of Discussion

Herein, various embodiments are described that provide input devices, processing systems, and methods that facilitate improved usability. In various embodiments described herein, the input device may be a capacitive sensing input device. Utilizing techniques described herein, efficiencies may be achieved by offsetting charge during capacitive sensing. That is, a conductor on a printed circuit which overlaps and parallels a routing trace the printed circuit may be utilized to offset charge. For example, a signal may be driven on the parallel conductor such that a capacitive coupling between the parallel conductor and the routing trace offsets some amount of a background capacitance experienced during absolute capacitive sensing with a sensor electrode that is coupled with the routing trace.

Discussion begins with a description of an example input device with which or upon which various embodiments described herein may be implemented. An example sensor electrode pattern is then described. This is followed by description of an example processing system and some components thereof. The processing system may be utilized with an input device, such as a capacitive sensing input device. Several example printed circuits which have parallel conductors that overlap routing traces are described. A circuit diagram of a processing system coupled with a sensor electrode by a printed circuit is described, as are a number of signals which may be utilized in the processing system and printed circuit. Operation of the capacitive sensing input device, processing system and components thereof, and the printed circuits are then further described in conjunction with description of a method of capacitive sensing.

Example Input Device

Figure 1:
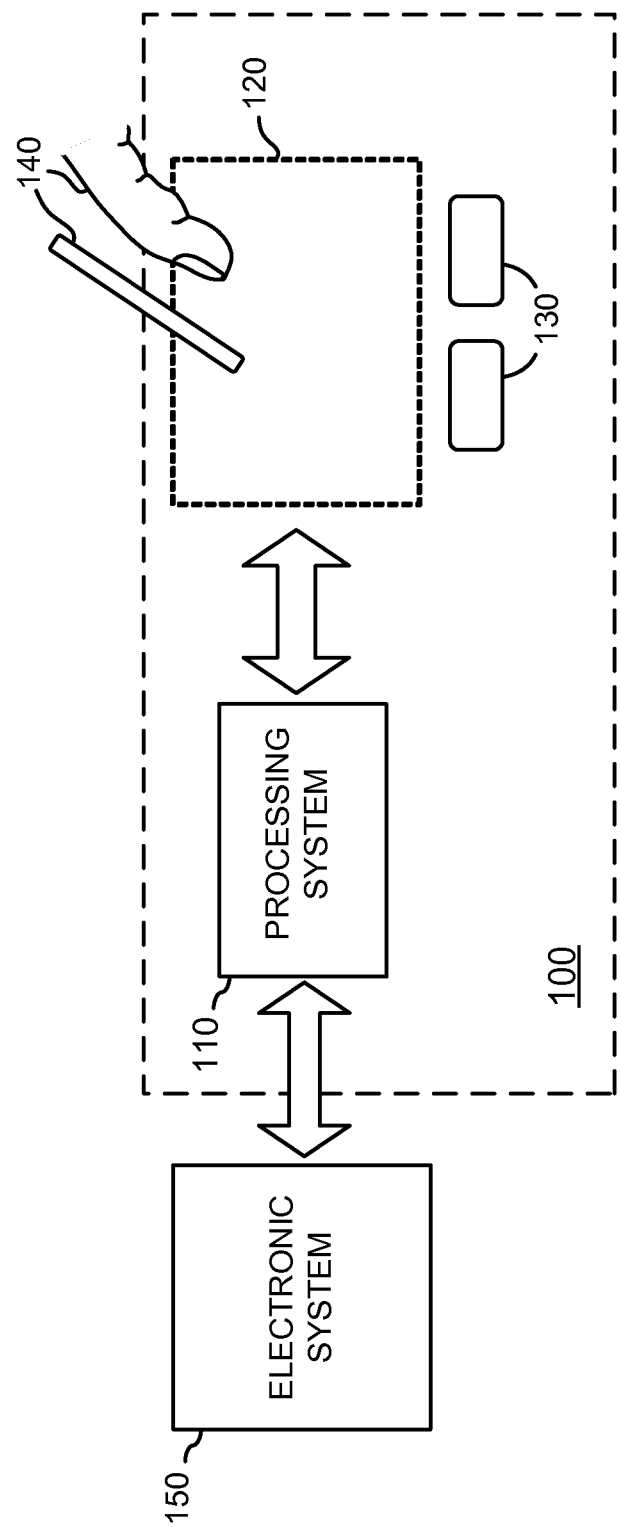
FIG. 1 is a block diagram of an example input device, in accordance with embodiments.

Turning now to the figures, FIG. 1 is a block diagram of an exemplary input device 100, in accordance with various embodiments. Input device 100 may be configured to provide input to an electronic system/device 150. As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic systems could be a host or a slave to the input device.

Input device 100 can be implemented as a physical part of an electronic system 150, or can be physically separate from electronic system 150. As appropriate, input device 100 may communicate with parts of the electronic system using any one or more of the following: buses, networks, and other wired or wireless interconnections. Examples include, but are not limited to: Inter-Integrated Circuit (I2C), Serial Peripheral Interface (SPI), Personal System 2 (PS/2), Universal Serial Bus (USB), Bluetooth®, Radio Frequency (RF), and Infrared Data Association (IrDA).

In FIG. 1, input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near input device 100, in which input device 100 is able to detect user input (e.g., user input provided by one or more input objects 140). The sizes, shapes, and locations of particular sensing regions may vary widely from embodiment to embodiment. In some embodiments, sensing region 120 extends from a surface of input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of input device 100, contact with an input surface (e.g., a touch surface) of input device 100, contact with an input surface of input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, sensing region 120 has a rectangular shape when projected onto an input surface of input device 100.

Input device 100 may utilize any combination of sensor components and sensing technologies to detect user input in sensing region 120. Input device 100 comprises one or more sensing elements for detecting user input. As a non-limiting example, input device 100 may use capacitive techniques.

Some implementations are configured to provide images that span one, two, three, or higher dimensional spaces. Some implementations are configured to provide projections of input along particular axes or planes.

In some capacitive implementations of input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Collectively transmitters and receivers may be referred to as sensor electrodes or sensor elements. Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive. In some embodiments, one or more receiver electrodes may be operated to receive a resulting signal when no transmitter electrodes are transmitting (e.g., the transmitters are disabled). In this manner, the resulting signal represents noise detected in the operating environment of sensing region 120.

In FIG. 1, a processing system 110 is shown as part of input device 100. Processing system 110 is configured to operate the hardware of input device 100 to detect input in sensing region 120. Processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, processing system 110 also comprises electronically-readable instructions, such as firmware code, software code, and/or the like. In some embodiments, components composing processing system 110 are located together, such as near sensing element(s) of input device 100. In other embodiments, components of processing system 110 are physically separate with one or more components close to sensing element(s) of input device 100, and one or more components elsewhere. For example, input device 100 may be a peripheral coupled to a desktop computer, and processing system 110 may comprise software configured to run on a central processing unit of the desktop computer and one or more ICs (perhaps with associated firmware) separate from the central processing unit. As another example, input device 100 may be physically integrated in a phone, and processing system 110 may comprise circuits and firmware that are part of a main processor of the phone. In some embodiments, processing system 110 is dedicated to implementing input device 100. In other embodiments, processing system 110 also performs other functions, such as operating display screens, driving haptic actuators, etc.

Processing system 110 may be implemented as a set of modules that handle different functions of processing system 110. Each module may comprise circuitry that is a part of processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, processing system 110 responds to user input (or lack of user input) in sensing region 120 directly by causing one or more actions. Example actions include changing operation modes, as well as GUI actions such as cursor movement, selection, menu navigation, and other functions. In some embodiments, processing system 110 provides information about the input (or lack of input) to some part of the electronic system (e.g., to a central processing system of the electronic system that is separate from processing system 110, if such a separate central processing system exists). In some embodiments, some part of the electronic system processes information received from processing system 110 to act on user input, such as to facilitate a full range of actions, including mode changing actions and GUI actions.

For example, in some embodiments, processing system 110 operates the sensing element(s) of input device 100 to produce electrical signals indicative of input (or lack of input) in sensing region 120. Processing system 110 may perform any appropriate amount of processing on the electrical signals in producing the information provided to the electronic system. For example, processing system 110 may digitize analog electrical signals obtained from the sensor electrodes. As another example, processing system 110 may perform filtering or other signal conditioning. As yet another example, processing system 110 may subtract or otherwise account for a baseline, such that the information reflects a difference between the electrical signals and the baseline. As yet further examples, processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, input device 100 is implemented with additional input components that are operated by processing system 110 or by some other processing system. These additional input components may provide redundant functionality for input in sensing region 120, or some other functionality. FIG. 1 shows buttons 130 near sensing region 120 that can be used to facilitate selection of items using input device 100. Other types of additional input components include sliders, balls, wheels, switches, and the like. Conversely, in some embodiments, input device 100 may be implemented with no other input components.

In some embodiments, input device 100 may be a touch screen, and sensing region 120 overlaps at least part of an active area of a display screen. For example, input device 100 may comprise substantially transparent sensor electrodes overlaying the display screen and provide a touch screen interface for the associated electronic system 150. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. Input device 100 and the display screen may share physical elements. For example, some embodiments may utilize some of the same electrical components for displaying and sensing. As another example, the display screen may be operated in part or in total by processing system 110.

It should be understood that while many embodiments are described in the context of a fully functioning apparatus, the mechanisms are capable of being distributed as a program product (e.g., software) in a variety of forms. For example, the mechanisms that are described may be implemented and distributed as a software program on information bearing media that are readable by electronic processors (e.g., non-transitory computer-readable and/or recordable/writable information bearing media readable by processing system 110). Additionally, the embodiments apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other non-transitory storage technology.

Example Sensor Electrode Pattern

Figure 2:
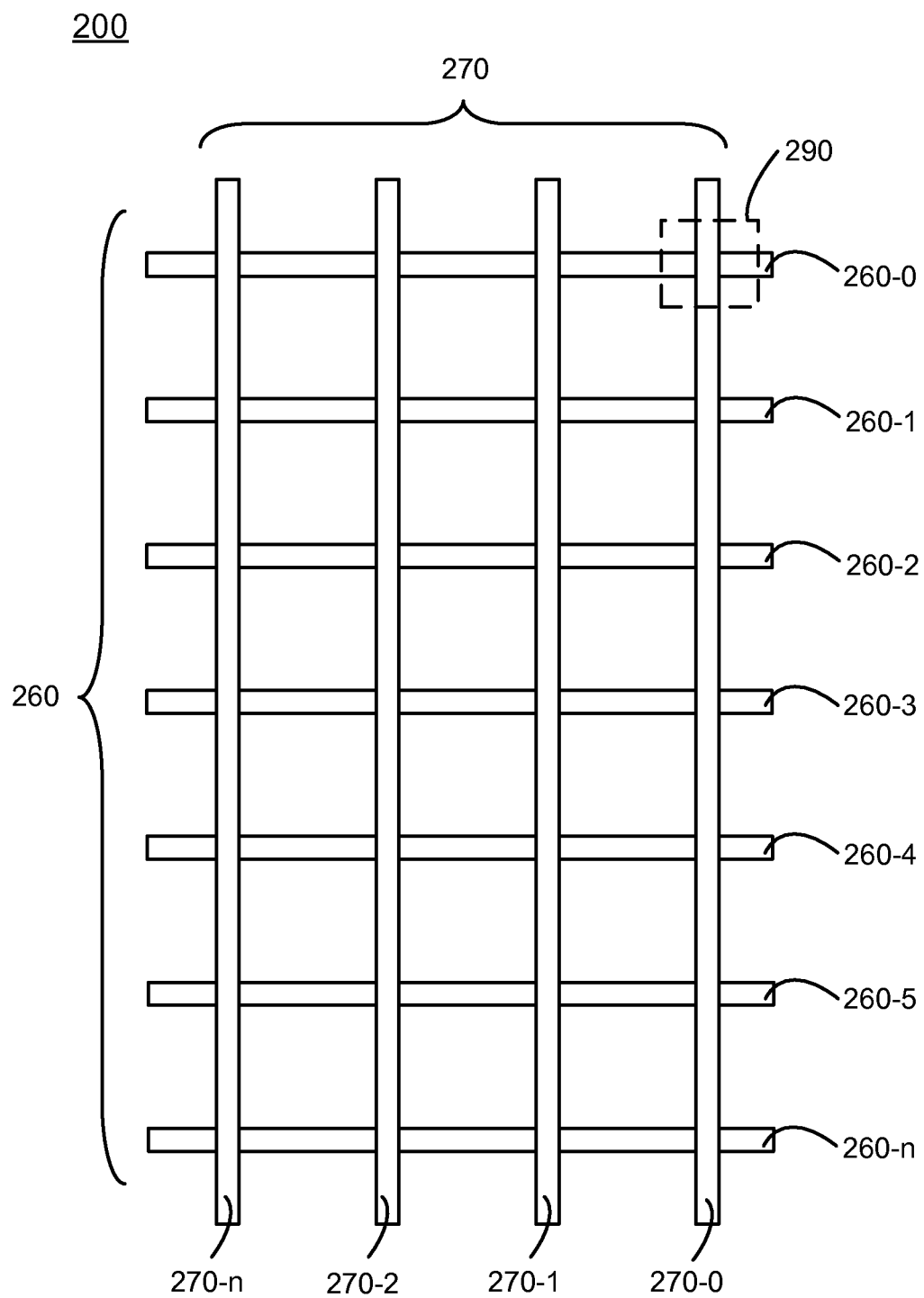
FIG. 2 shows a portion of an example sensor electrode pattern which may be utilized in a sensor to generate all or part of the sensing region of an input device, such as a touch screen, according to some embodiments.

FIG. 2 shows a portion of an example sensor electrode pattern 200 which may be utilized in a sensor to generate all or part of the sensing region of a input device 100, according to various embodiments. Input device 100 is configured as a capacitive input device when utilized with a capacitive sensor electrode pattern. For purposes of clarity of illustration and description, a non-limiting simple rectangular sensor electrode pattern 200 is illustrated. It is appreciated that numerous other sensor electrode patterns may be employed including patterns with a single set of sensor electrodes, patterns with two sets of sensor electrodes disposed in a single layer (without overlapping), and patterns that provide individual button electrodes. The illustrated sensor electrode pattern is made up of a plurality of receiver electrodes 270 (270-0, 270-1, 270-2 . . . 270-n) and a plurality of transmitter electrodes 260 (260-0, 260-1, 260-2 . . . 260-n) which overlay one another, in this example. In the illustrated example, touch sensing pixels are centered at locations where transmitter and receiver electrodes cross. Capacitive pixel 290 illustrates one of the capacitive pixels generated by sensor electrode pattern 200 during transcapacitive sensing. It is appreciated that in a crossing sensor electrode pattern, such as the illustrated example, some form of insulating material or substrate is typically disposed between transmitter electrodes 260 and receiver electrodes 270. However, in some embodiments, transmitter electrodes 260 and receiver electrodes 270 may be disposed on the same layer as one another through use of routing techniques and/or jumpers. In various embodiments, touch sensing includes sensing input objects anywhere in sensing region 120 and may comprise: no contact with any surfaces of the input device 100, contact with an input surface (e.g., a touch surface) of the input device 100, contact with an input surface of the input device 100 coupled with some amount of applied force or pressure, and/or a combination thereof.

When accomplishing transcapacitive measurements, capacitive pixels, such as capacitive pixel 290, are areas of localized capacitive coupling between transmitter electrodes 260 and receiver electrodes 270. The capacitive coupling between transmitter electrodes 260 and receiver electrodes 270 changes with the proximity and motion of input objects in the sensing region associated with transmitter electrodes 260 and receiver electrodes 270.

In some embodiments, sensor electrode pattern 200 is "scanned" to determine these capacitive couplings. That is, the transmitter electrodes 260 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 270 to be independently determined.

The receiver electrodes 270 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some embodiments, one or more sensor electrodes 260 or 270 may be operated to perform absolute capacitive sensing at a particular instance of time. For example, receiver electrode 270-0 may be charged and then the capacitance of receiver electrode 270-0 may be measured. In such an embodiment, an input object 140 interacting with receiver electrode 270-0 alters the electric field near receiver electrode 270-0, thus changing the measured capacitive coupling. In this same manner, a plurality of sensor electrodes 270 may be used to measure absolute capacitance and/or a plurality of sensor electrodes 260 may be used to measure absolute capacitance. It should be appreciated that when performing absolute capacitance measurements the labels of "receiver electrode" and "transmitter electrode" lose the significance that they have in transcapacitive measurement techniques, and instead a sensor electrode 260 or 270 may simply be referred to as a "sensor electrode" or may continue to use its designation as a transmitter electrode or a receiver electrode even though they are used in the same manner during absolute capacitive sensing.

Background capacitance, $C_B$, is the capacitive image of a sensor pattern or the absolute capacitance measured on a sensor electrode with no input object in the sensing region of a sensor electrode pattern. The background capacitance changes with the environment and operating conditions.

Capacitive images and absolute capacitance measurements can be adjusted for the background capacitance of the sensor device for more efficient processing. For example, various techniques may be employed internal and/or external to an ASIC/processing system to subtract/offset some amount of the baseline capacitance that is known to be present in an absolute capacitive measurement. In absolute capacitive sensing, such charge offsetting improves the dynamic range of an amplifier of the ASIC/processing system that is used to amplify a signal which includes an input object related component on top of the baseline absolute capacitance signal measurement. This is because the component of the signal attributed to presence of an input object can be more greatly amplified (without amplifier saturation) if some of the baseline portion is removed by internal offsetting.

Many techniques for internal offset (internal to the ASIC/processing system) of a baseline charge are known in the art and include utilizing an offsetting capacitance in parallel with a feedback capacitor of the amplifier and/or injecting charge to an input of the amplifier that is also coupled with the sensor from which an absolute capacitance is being measured.

In some embodiments, using techniques herein, one or more portions of a printed circuit (e.g., a flexible printed circuit, a printed circuit board, a lithographically printed circuit, or other type of printed circuit) that includes routing traces used to couple sensing signals to and/or from sensors in a sensing region of a sensing device can be used to offset some amount of the baseline capacitance measured during absolute capacitive sensing. This type of charge offsetting is accomplished external to the ASIC/processing system. It should be appreciated that any of the external charge offsetting techniques described herein may be utilized alone or may be used in combination with one or more internal charge offsetting techniques.

Example Processing System

Figure 3:
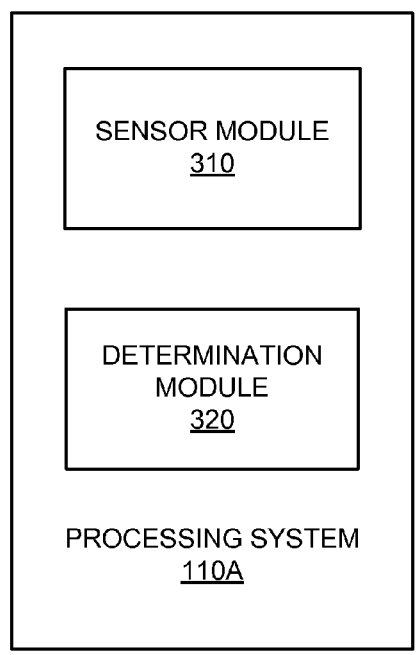
FIG. 3 illustrates a block diagram of some components of an example processing system that may be utilized with a capacitive sensing input device, according to various embodiments.

FIG. 3 illustrates a block diagram of some components of an example processing system 110A that may be utilized with an input device (e.g., in place of processing system 110 as part of input device 100), according to various embodiments. Processing system 110A may be implemented with one or more Application Specific Integrated Circuits (ASICSs), one or more Integrated Circuits (ICs), one or more controllers, or some combination thereof. In one embodiment, processing system 110A is communicatively coupled with one or more sensor electrodes of a first and second plurality (e.g., sensor electrodes 260 and 270) that implement a sensing region 120 of an input device 100. In some embodiments, processing system 110A and the input device 100 of which it is a part may be disposed in or communicatively coupled with an electronic system 150, such as a display device, computer, or other electronic system.

In one embodiment, processing system 110A includes, among other components: sensor module 310, and determination module 320. Processing system 110A and/or components thereof may be coupled with sensor electrodes of a sensor electrode pattern, such as sensor electrode pattern 200, among others. For example, sensor module 310 is coupled with one or more sensor electrodes (260, 270) of a sensor electrode pattern (e.g., sensor electrode pattern 200) of input device 100. As will be described herein, in some embodiments, processing system (e.g., sensor module 310) is coupled to one or more conductors that are disposed within a printed circuit that also includes the routing traces which carry signals between processing system 110A and sensor electrodes of a sensor electrode pattern. These conductors are disposed in a different layer of the printed circuit than the routing traces and are arranged such that they overlap and parallel one or more of the routing traces in a manner that permits a capacitive coupling between the overlapped routing races and a parallel conductor that overlaps them.

Sensor module 310 comprises sensor circuitry and operates to interact with the sensor electrodes, of a sensor electrode pattern, that are utilized to generate a sensing region 120. This includes operating a first plurality of sensor electrodes (e.g., transmitter electrodes 270) to be silent, to be driven with a transmitter signal, to be used for transcapacitive sensing, and/or to be used for absolute capacitive sensing. This also includes operating a second plurality of sensor electrodes (e.g., receiver electrodes 270) to be silent, to be driven with a transmitter signal, to be used for transcapacitive sensing, and/or to be used for absolute capacitive sensing.

During transcapacitive sensing, sensor module 310 operates to drive transmitter signals on one or more sensor electrodes of a first plurality of sensor electrodes (e.g., one or more of transmitter electrodes 260). A transmitter signal may be a square wave, trapezoidal wave, or some other waveform. In a given time interval, sensor module 310 may drive or not drive a transmitter signal (waveform) on one or more of the plurality of sensor electrodes. Sensor module 310 may also be utilized to couple one or more of the first plurality of sensor electrodes to high impedance, ground, or to a constant voltage when not driving a transmitter signal on such sensor electrodes. In some embodiments, when performing transcapacitive sensing, sensor module 310 drives two or more transmitter electrodes of a sensor electrode pattern at one time. When driving two or more sensor electrodes of a sensor electrode pattern at once, the transmitter signal may be coded according to a code. Sensor module 310 also operates to receive resulting signals, via a second plurality of sensor electrodes (e.g., one or more of receiver electrodes 270) during transcapacitive sensing. During transcapacitive sensing, received resulting signals correspond to and include effects corresponding to the transmitter signal(s) transmitted via the first plurality of sensor electrodes. These transmitted transmitter signals may be altered or changed in the resulting signal due to presence of an input object, stray capacitance, noise, interference, and/or circuit imperfections among other factors, and thus may differ slightly or greatly from their transmitted versions. During transcapacitive sensing (which is performed at a different time than absolute capacitive sensing), sensor module 310 may couple a parallel conductor with ground potential so that routing traces which are overlapped by the grounded parallel conductor are shielded.

During absolute capacitive sensing sensor module 310 also operates to drive a transmitter signal on and receive a resulting signal from one or more of sensor electrodes 260 or 270. During absolute capacitive sensing, this transmitter signal may be referred to as an absolute capacitive sensing signal and it is driven through a routing trace that provides a communicative coupling between processing system 110A and the sensor electrode with which absolute sensing is being conducted. While performing absolute capacitive sensing, resulting signals may be received on one or a plurality of sensor electrodes during a time interval. In absolute capacitive sensing, a sensor electrode is both driven and used to receive a resulting signal. During absolute capacitive sensing, sensor module 310 couples the parallel conductor(s) to one of a variety of signals and/or potentials depending on the desired effect.

For example, in some embodiments, when an absolute capacitive sensing signal is driven through a routing trace, a parallel conductor that overlaps that routing trace has the same absolute capacitive sensing signal (same phase and same amplitude) driven on it so that it guards the routing trace from interference; this may be referred to as "guarding." In some embodiments, when an absolute capacitive sensing signal is driven through a routing trace, a parallel conductor that overlaps that routing trace has a signal of the same phase but of different amplitude driven on it so that it may cause a desired capacitive coupling and with the overlapped trace. When the parallel conductor that overlaps the routing trace is driven with a signal having the same phase but greater amplitude than the absolute capacitive sensing signal, it causes charge to be subtracted from the overlapped routing trace; this may be referred to as "over guarding." When the parallel conductor that overlaps the routing trace is driven with a signal of the same phase but of lesser amplitude than the absolute capacitive sensing signal, a different capacitive coupling takes place; this may be referred to as "under guarding." In some embodiments, when an absolute capacitive sensing signal is driven through a routing trace, a parallel conductor that overlaps that routing trace has a signal of opposite phase driven on it so that it may cause a desired capacitive coupling with the overlapped trace; this may be referred to as anti-guarding.

In some embodiments, a parallel conductor may be coupled with ground or high impedance during a time period when no absolute capacitive sensing is conducted with any routing trace that is overlapped by the parallel conductor. For example, this can occur when an absolute capacitive signal is being driven through a routing trace that is not overlapped by the parallel conductor.

Sensor module 310 includes a plurality of amplifiers. Such amplifiers may be referred to as amplifiers, front-end amplifiers, integrating amplifiers, differential amplifiers, or the like, and receive a resulting signal at an input. The resulting signal is from a sensor electrode of a sensor electrode pattern, such as sensor electrode pattern 200.

Determination module 320 may be implemented as hardware (e.g., hardware logic and/or other circuitry) and/or as a combination of hardware and instructions stored in a non-transitory manner in a computer readable storage medium.

Determination module 320 operates to compute/determine a measurement of a change in a transcapacitive capacitive coupling between a first and second sensor electrode during transcapacitive sensing. Determination module 320 then uses such measurements to determine the positional information comprising the position of an input object (if any) with respect to sensing region 120. The positional information can be determined from a capacitive image. The capacitive is determined by determination module 320 based upon resulting signals acquired by sensor module 310. It is appreciated that determination module 320 operates to decode and reassemble coded resulting signals to construct a capacitive image from a transcapacitive scan of a plurality of sensor electrodes.

In embodiments where absolute capacitive sensing is performed with sensor electrodes 260 and/or 270, determination module 320 also operates to compute/determine a measurement of absolute capacitive coupling to a sensor electrode. Determination module 320 may use these measurements to determine whether or not an input object is present in a sensing region. Determination module 320 may also use these measurements to determine the position of an input object with respect to a sensing region. A variety of techniques for determining position of an input object, based on such measurements, are known in the art.

In some embodiments, processing system 110A comprises decision making logic which directs one or more portions of processing system 110A, such as sensor module 310 and/or determination module 320, to operate in a selected one of a plurality of different operating modes based on various inputs.

Example Printed Circuits

Figure 4:
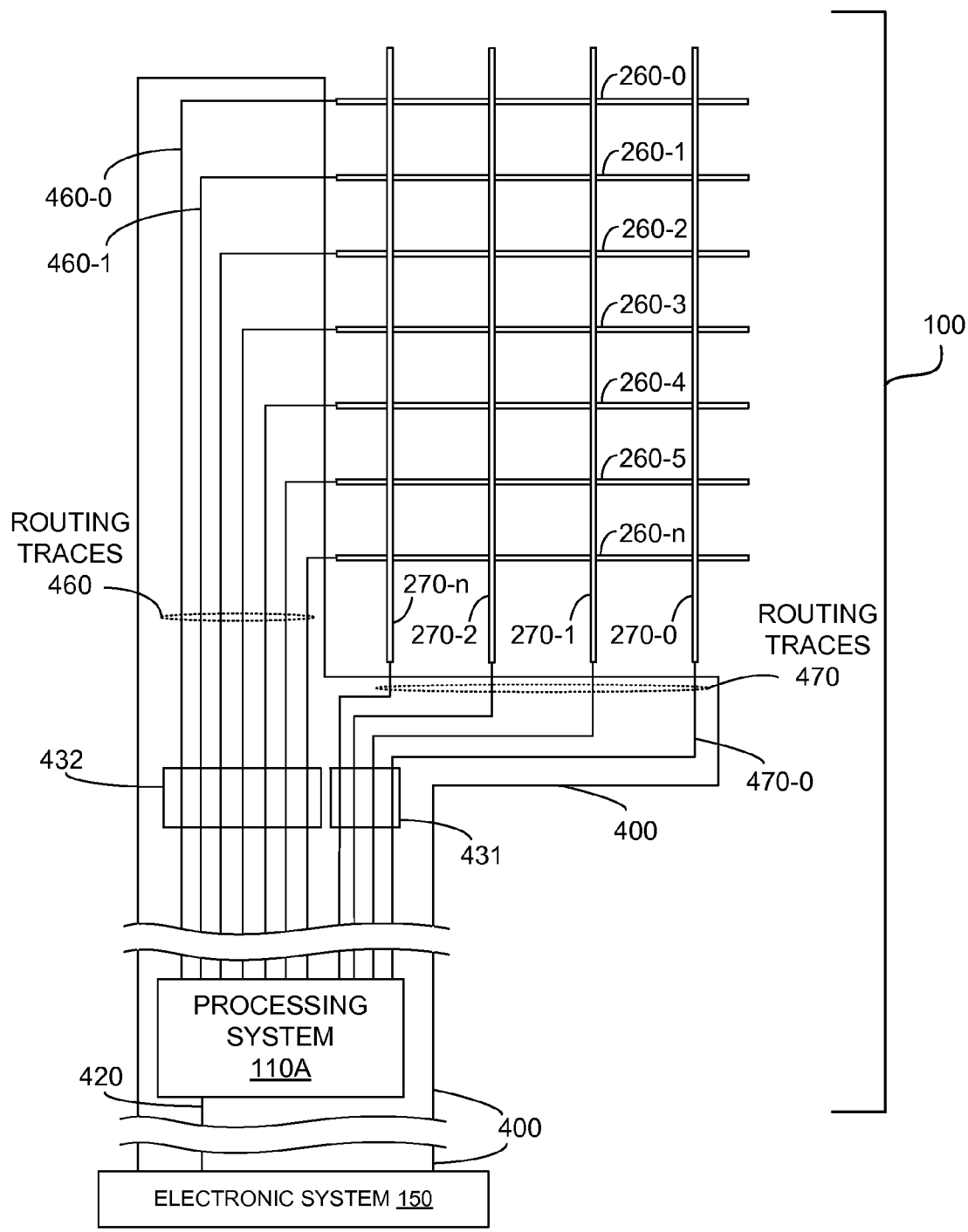
FIG. 4 illustrates a plan view of an example flexible printed circuit usable within a capacitive sensing input device, according to some embodiments.

FIG. 4 illustrates a plan view of an example printed circuit 400 utilized as a portion of a capacitive sensing input device 100, according to some embodiments. Printed circuit 400 may be implemented in a number of ways, such as via lithographically printed circuit, as a printed circuit board (PCB), or as a flexible printed circuit, to name a few. Printed circuit 400 includes a plurality of routing traces 460, 470. Routing traces 460 are used to communicatively couple signals between processing system 110A and transmitter electrodes 260. For example, routing trace 460-0 can communicatively couple signals between processing system 110A and transmitter electrode 260-0. Routing traces 470 are used to communicatively couple signals between processing system 110A and receiver electrodes 270. For example, routing trace 470-0 can communicatively couple signals between processing system 110A and receiver electrode 270-0. In some embodiments, printed circuit 400 may additional provide communicative coupling(s) (e.g., signal line 420) between processing system 110A and an electronic system 150 that is coupled with capacitive sensing input device 100.

Parallel conductor 431 is disposed as a portion of printed circuit 400 and overlaps and parallels each of routing traces 470 for an equal distance along their span between processing system 100A and sensor electrodes 270. Parallel conductor 432 is disposed as a portion of printed circuit 400 and overlaps and parallels each of routing traces 460 for an equal distance along their span between processing system 110A and sensor electrodes 260. Parallel conductors 431 and 432 are made of a conductive material such as copper. In some embodiments, parallel conductors 431 and 432 may be etched from a layer of printed circuit that is conventionally used for shielding. The remainder of this shielding layer may be etched away, kept in place, or etched into additional parallel conductors. For purposes of clarity, the remaining portion of this copper layer has been omitted in FIG. 4.

Figure 8:
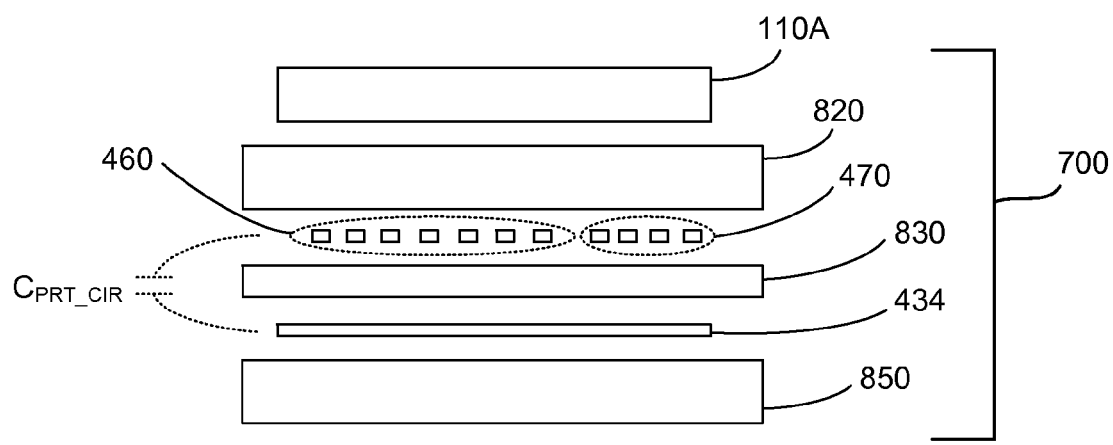
FIG. 8 illustrates an exploded side section view of an example flexible printed circuit implementation of the printed circuit of FIG. 7, according to some embodiments.

An embodiment that depicts one possible stackup of a flexible printed circuit implementation is illustrated in 8; however, many of the layers which appear in the stackup illustrated in FIG. 8 or which would be present in other possible stackups have been omitted in FIG. 4 so the relationship between parallel conductors 431 and 432 and the routing traces 470 and 460 can be depicted. For example, undepicted dielectric material that separates parallel conductor 431 from routing traces 470 has been omitted for clarity of illustration. Likewise, undepicted dielectric material that separates parallel conductor 432 from routing traces 460 has also been omitted for clarity of illustration.

In one embodiment, each of parallel conductors 431 and 432 is coupled to a different transmitter pin of processing system 110A (such as with a through hole in the printed circuit) so that they may be driven independently and/or coupled with a potential. Consider an example where absolute capacitive sensing is performed with one or more of sensor electrodes 260, but is not being performed with any of sensor electrodes 270. In this example, parallel conductor 431 may be grounded for shielding routing traces 470 while a signal is transmitted on parallel conductor 432. When the transmitted signal is in-phase with the absolute capacitive sensing signal being transmitted through more of routing traces 460, the amplitude of the transmitted signal may be selected to under guard, guard, or over guard routing traces 460. When over guarding takes place the transmitted signal is an offsetting signal, as the greater amplitude of the signal on parallel conductor 432 capacitively couples with and offsets (subtracts) charge from any of routing traces 460 being used to couple absolute capacitive sensing signals between sensor electrodes 260 and processing system 110A.

Consider an example where absolute capacitive sensing is performed with one or more of sensor electrodes 270, but is not being performed with any of sensor electrodes 260. In this example, parallel conductor 432 may be grounded for shielding routing traces 460 while an offsetting signal is transmitted on parallel conductor 431. When the transmitted signal is in-phase with the absolute capacitive sensing signal being transmitted through more of routing traces 470, the amplitude of the transmitted signal may be selected to under guard, guard, or over guard routing traces 470. When over guarding takes place the transmitted signal is an offsetting signal, and the greater amplitude of the offsetting signal on parallel conductor 431 offsets (subtracts) charge from any of routing traces 470 which are being used to couple absolute capacitive sensing signals between sensor electrodes 270 and processing system 110A.

Consider an example where absolute capacitive sensing is performed simultaneously with one or more of sensor electrodes 270 and with one or more of sensor electrodes 260. In this example, signals may be transmitted on both parallel conductor 432 and parallel conductor 431. In one embodiment, the signal transmitted on parallel conductor 431 is in-phase with the absolute capacitive sensing signal being transmitted through one or more of routing races 470, while the signal transmitted on parallel conductor 432 is in-phase with absolute capacitive sensing signal being transmitted through one or more of routing traces 460. The amplitudes of the signals transmitted on each of parallel conductors 431 and 432 may be identical or different and each may be selected to under guard, guard, or over guard the routing traces overlapped by each of the respective parallel conductors. In one embodiment, the amplitude of an over guarding offsetting signal coupled with parallel conductor 432 is greater than the amplitude of an over guarding offsetting signal transmitted on parallel conductor 431, as there is more background capacitance to offset from routing traces 460 due to their generally greater length than routing traces 470 and thus greater environmental exposure and greater exposure to electronic signals of a display panel, capacitive sensor, electronic device, etc.

In an embodiment where transcapacitive sensing is performed using sensor electrodes 260 and 270 (at a separate time from when these sensor electrodes are being used for absolute capacitive sensing), one or both of parallel conductors 431 and 432 may be coupled with ground to provide shielding for the routing traces 470 and 460 which are overlapped by the respective parallel conductors.

Figure 5:
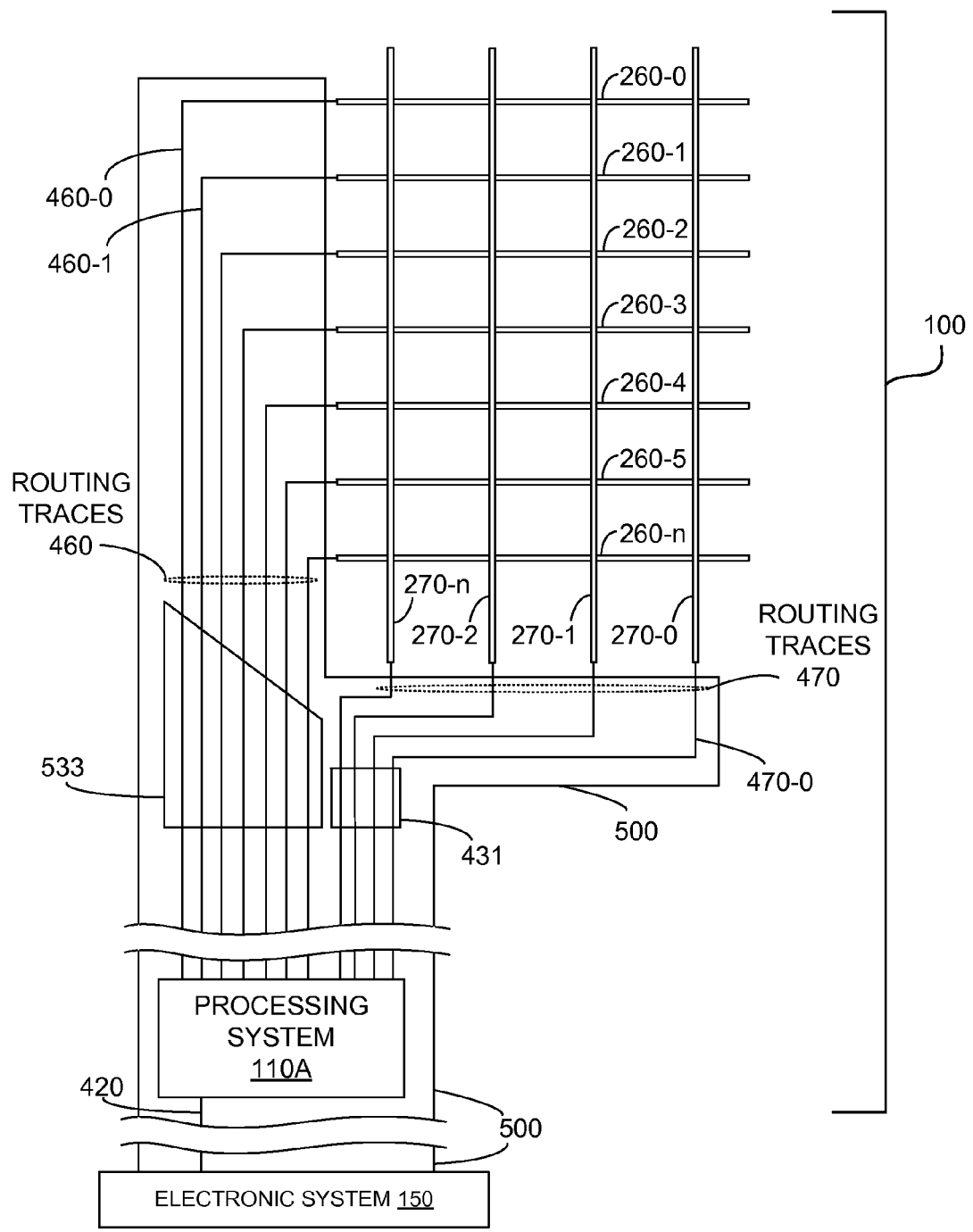
FIG. 5 illustrates a plan view of an example flexible printed circuit useable within a capacitive sensing input device, according to some embodiments.

FIG. 5 illustrates a plan view of an example printed circuit 500 utilized as a portion of a capacitive sensing input device 100, according to some embodiments. Printed circuit 500 may be implemented in a number of ways, such as via lithographically printed circuit, as a printed circuit board (PCB), or as a flexible printed circuit, to name a few. Printed circuit 500 is very similar to printed circuit 400 except that parallel conductor 432 has been replaced with parallel conductor 533. Parallel conductor 533 is shaped such that it parallels and overlaps each of routing traces 460 for a different distance along their respective spans. For example, the slanted portion of parallel conductor 533 causes routing trace 460-1 to be overlapped for a greater length than routing trace 460-1. This shaping allows for capacitive coupling to be greater for longer traces, as the longer the routing trace, the greater the portion of its span that is overlapped. Other shapes may be used to obtain a similar result, for example the slanted portion of parallel conductor 533 is stair-stepped in some embodiments.

Parallel conductor 533 is disposed as a portion of printed circuit 500. Parallel conductor 533 is made of a conductive material such as copper. In some embodiments, parallel conductors 431 and 533 may be etched from a layer of printed circuit that is conventionally used for shielding. The remainder of this shielding layer may be etched away, kept in place, or etched into additional parallel conductors. For purposes of clarity, the remaining portion of this copper layer has been omitted in FIG. 5.

An embodiment that depicts one possible stackup of a flexible printed circuit implementation is illustrated in 8; however, many of the layers which appear in the stackup illustrated in FIG. 8 or which would be present in other possible stackups have been omitted in FIG. 5 so the relationship between parallel conductors 431 and 533 and the routing traces 460 and 470 can be depicted. For example, undepicted dielectric material that separates parallel conductor 431 from routing traces 470 has been omitted for clarity of illustration. Likewise, undepicted dielectric material that separates parallel conductor 533 from routing traces 470 has also been omitted for clarity of illustration.

In one embodiment, each of parallel conductors 431 and 533 is coupled to a different transmitter pin of processing system 110A (such as with a through hole in the printed circuit) so that they may be driven independently and/or coupled with a potential. Parallel conductor 533 is utilized in a similar fashion to the previously described use of parallel conductor 432, and can thus be used for offsetting charge from any of routing traces 460 when they are being utilized to communicate absolute capacitive sensing signals between processing system 110A and sensor electrodes 260.

Figure 6:
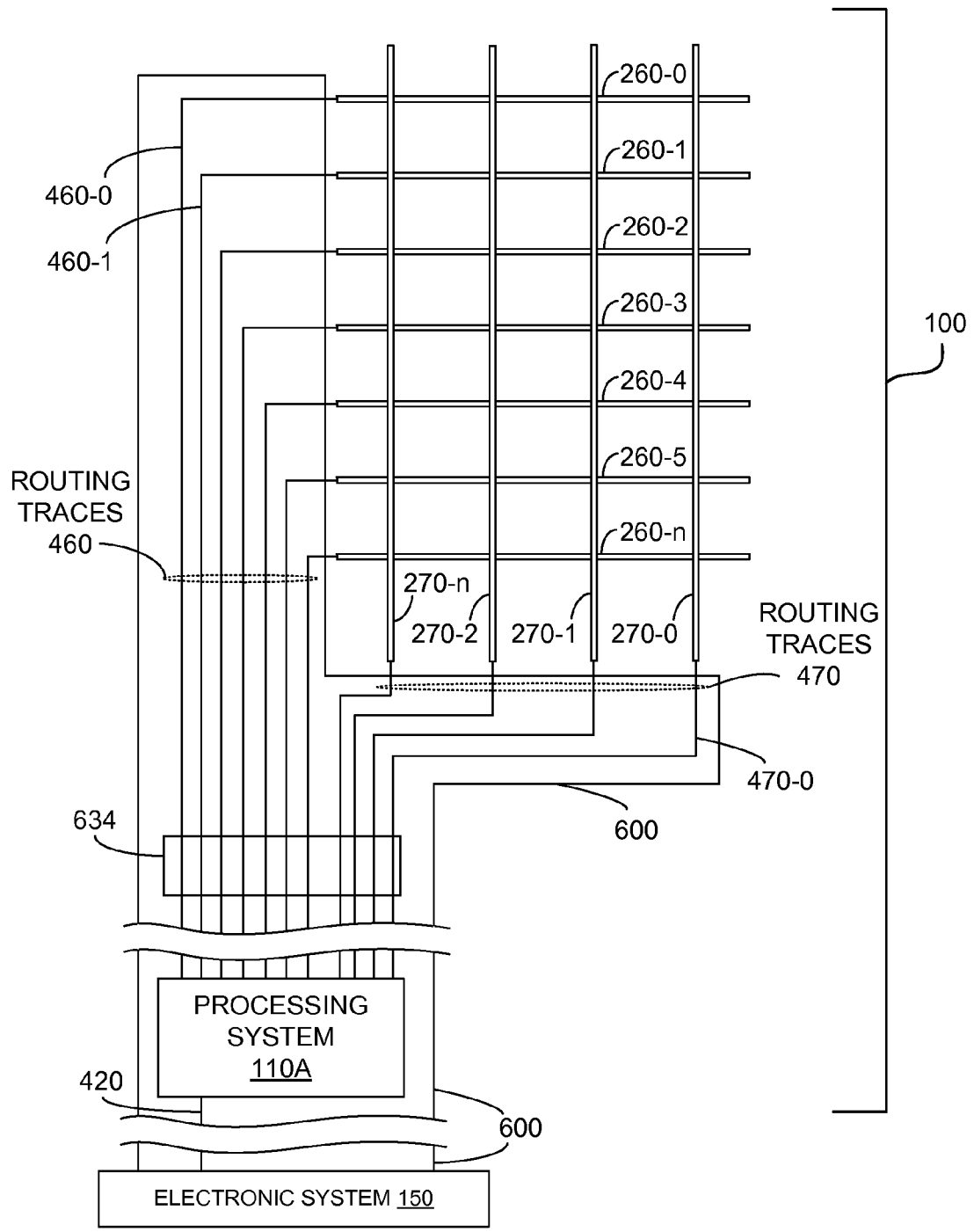
FIG. 6 illustrates a plan view of an example printed circuit usable within a capacitive sensing input device, according to some embodiments.

FIG. 6 illustrates a plan view of an example printed circuit 600 utilized as a portion of a capacitive sensing input device 100, according to some embodiments. Printed circuit 600 may be implemented in a number of ways, such as via lithographically printed circuit, as a printed circuit board (PCB), or as a flexible printed circuit, to name a few. Printed circuit 600 is very similar to printed circuit 400 except that the separate parallel conductors 431 and 432 have been omitted and a single parallel conductor 634 has been included which overlaps both routing traces 460 and routing traces 470. Parallel conductor 634 is disposed as a portion of printed circuit 600. Parallel conductor 634 is shaped such that it parallels and overlaps each of routing traces 460 and routing traces 470 for the same distance along their respective spans.

Parallel conductor 634 is made of a conductive material such as copper. In some embodiments, parallel conductor 634 may be etched from a layer of printed circuit that is conventionally used for shielding. The remainder of this shielding layer may be etched away, kept in place, or etched into additional parallel conductors. For purposes of clarity, the remaining portion of this copper layer has been omitted in FIG. 6.

An embodiment that depicts one possible stackup of a flexible printed circuit implementation is illustrated in 8; however, many of the layers which appear in the stackup illustrated in FIG. 8 or which would be present in other possible stackups have been omitted in FIG. 6 so the relationship between parallel conductor 634 and the routing traces 460 and 470 can be depicted. For example, undepicted dielectric material that separates parallel conductor 634 from routing traces 460 and 470 has been omitted for clarity of illustration.

In one embodiment, parallel conductor 634 is coupled to a transmitter pin of processing system 110A (such as with a through hole in the printed circuit) so it may be driven with a signal or coupled with a potential. Consider an example where absolute capacitive sensing is performed with one or more of sensor electrodes 260, but is not being performed with any of sensor electrodes 270. In this example, a signal is transmitted on parallel conductor 634. When the transmitted signal is in-phase with the absolute capacitive sensing signal being transmitted through more of routing traces 460, the amplitude of the transmitted signal may be selected to under guard, guard, or over guard routing traces 460. When over guarding takes place the transmitted signal is an offsetting signal, as the greater amplitude of the signal on parallel conductor 634 capacitively couples with and offsets (subtracts) charge from any of routing traces 460 being used to couple absolute capacitive sensing signals between sensor electrodes 260 and processing system 110A. When guarding takes place the transmitted signal is a signal of the same amplitude as the amplitude of the absolute capacitive sensing signals between transmitted through one or more of routing traces 460.

Consider an example where absolute capacitive sensing is performed with one or more of sensor electrodes 270, but is not being performed with any of sensor electrodes 260. In this example, a signal is transmitted on parallel conductor 634. When the transmitted signal is in-phase with the absolute capacitive sensing signal being transmitted through more of routing traces 470, the amplitude of the transmitted signal may be selected to under guard, guard, or over guard routing traces 470. When over guarding takes place the transmitted signal is an offsetting signal, as the greater amplitude of the signal on parallel conductor 634 capacitively couples with and offsets (subtracts) charge from any of routing traces 470 being used to couple absolute capacitive sensing signals between sensor electrodes 270 and processing system 110A. When guarding takes place the transmitted signal is a signal of the same amplitude as the amplitude of the absolute capacitive sensing signals between transmitted through one or more of routing traces 470.

Consider an example where absolute capacitive sensing is performed simultaneously with one or more of sensor electrodes 270 and with one or more of sensor electrodes 260. In one embodiment, the signal transmitted on parallel conductor 634 is in-phase with the absolute capacitive sensing signal being transmitted through the routing traces. The amplitude of the signal transmitted on parallel conductor 634 may be selected to under guard, guard, or over guard the routing traces overlapped by each of the respective parallel conductors.

In an embodiment where transcapacitive sensing is performed using sensor electrodes 260 and 270 (at a separate time from when these sensor electrodes are being used for absolute capacitive sensing), one parallel conductor 634 may be coupled with ground to provide shielding for the routing traces 470 and 460 which it overlaps.

Figure 7:
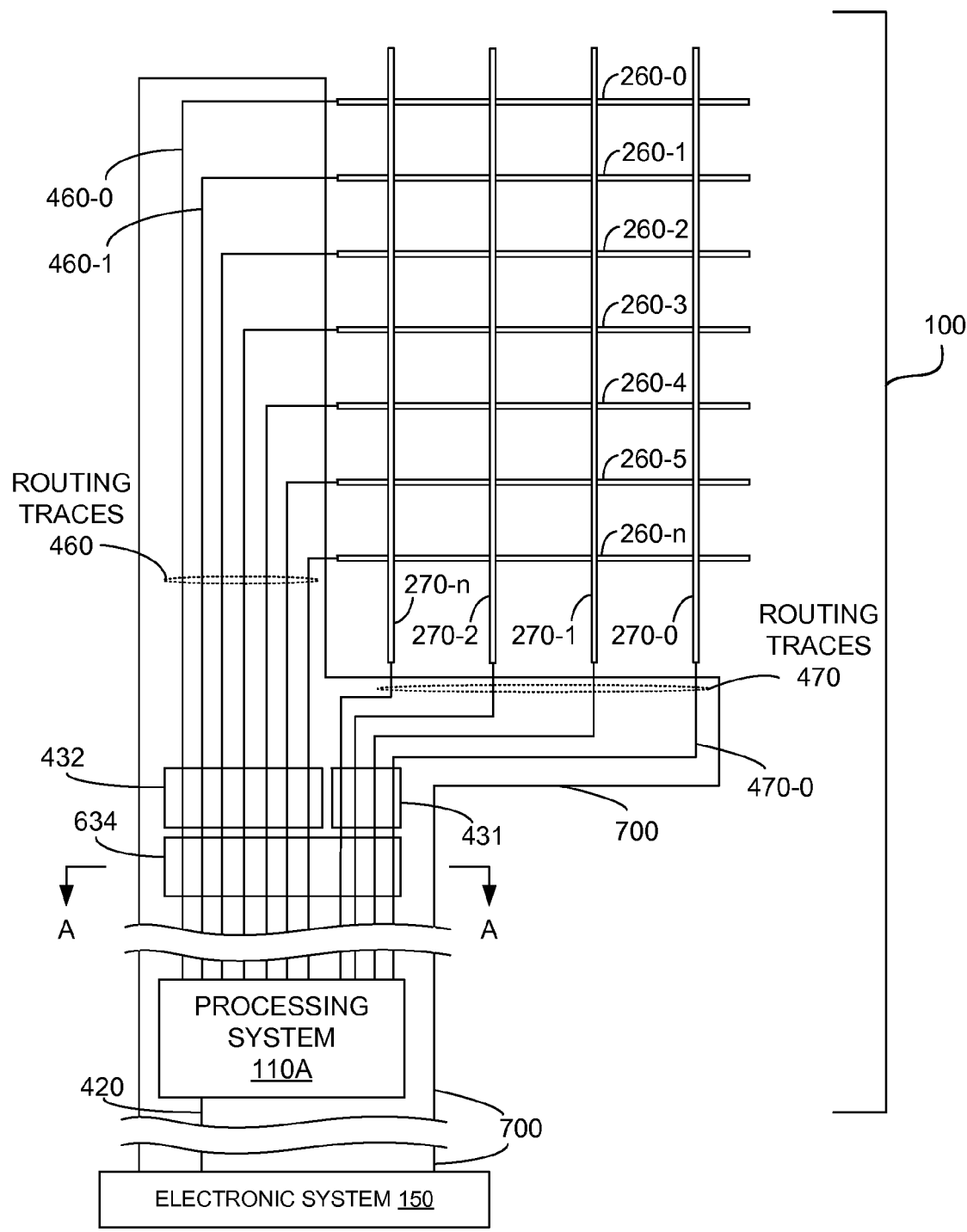
FIG. 7 illustrates a plan view of an example printed circuit usable within a capacitive sensing input device, according to some embodiments.

FIG. 7 illustrates a plan view of an example printed circuit 700 utilized as a portion of a capacitive sensing input device 100, according to some embodiments. Printed circuit 700 may be implemented in a number of ways, such as via lithographically printed circuit, as a printed circuit board (PCB), or as a flexible printed circuit, to name a few. Printed circuit 700 is very similar to and is essentially a combination of printed circuits 400 and 600 in that it includes separate parallel conductors 431 and 432 along with parallel conductor 634.

Parallel conductors 432, 432, and 634 are made of a conductive material such as copper. In some embodiments, parallel conductors 431, 432, and 634 may be etched from a layer of printed circuit that is conventionally used for shielding. The remainder of this shielding layer may be etched away, kept in place, or etched into additional parallel conductors. For purposes of clarity, the remaining portion of this copper layer has been omitted in FIG. 7.

An embodiment that depicts one possible stackup of a flexible printed circuit implementation is illustrated in 8; however, many of the layers which appear in the stackup illustrated in FIG. 8 or which would be present in other possible stackups have been omitted in FIG. 7 so the relationship between parallel conductors 431, 432, and 634 and the routing traces 460 and 470 can be depicted. For example, undepicted dielectric material that separates parallel conductors 431, 432, and 634 from routing traces 460 and 470 has been omitted for clarity of illustration.

In one embodiment, each of parallel conductors 431, 432, and 634 is coupled to a separate transmitter pin of processing system 110A (such as with a through hole in the printed circuit) so that they may be independently driven with a signal and/or coupled with a potential. Consider an example where absolute capacitive sensing is performed with one or more of sensor electrodes 260, but is not being performed with any of sensor electrodes 270. In this example, parallel conductor 431 may be grounded for shielding routing traces 470 while a guard signal is transmitted on parallel conductor 634 and an over guarding offsetting signal is transmitted on parallel conductor 432.

Consider an example where absolute capacitive sensing is performed with one or more of sensor electrodes 270, but is not being performed with any of sensor electrodes 260. In this example, parallel conductor 432 may be grounded for shielding routing traces 460 while a guard signal is transmitted on parallel conductor 634 and an over guarding offsetting signal is transmitted on parallel conductor 431.

Consider an example where absolute capacitive sensing is performed simultaneously with one or more of sensor electrodes 270 and with one or more of sensor electrodes 260. In this example, a guard signal may be transmitted on parallel conductor 634 while distinct under guarding, guarding, or over guarding signals may be transmitted on each of parallel conductors 431 and 432.

In an embodiment where transcapacitive sensing is performed using sensor electrodes 260 and 270 (at a separate time from when these sensor electrodes are being used for absolute capacitive sensing), one or more of parallel conductors 431, 432, and 634 may be coupled with ground to provide shielding for the routing traces 470 and 460 which are overlapped by the respective parallel conductors.

It should be understood that the illustrated embodiments may be combined and or utilized in a variety of ways that are not illustrated. For example: with reference to FIG. 4, in one embodiment, either one of parallel conductors 431 and 432 may be omitted; with reference to FIG. 7, either of parallel conductors 431 and 432 may be omitted and/or replaced by a shaped conductor similar to parallel conductor 533; with reference to FIGS. 6 and 7, all or a portion of parallel conductor 634 may be shaped such that some overlapped routing traces are overlapped for a greater distance than others. It should be appreciated that not all routing traces are required to be overlapped by a parallel conductor of the type described herein. Additionally, in some embodiments, such as the embodiment depicted in FIG. 4, some routing traces (460, 470) may be overlapped by both of parallel conductors 431 and 432.

Example Printed Circuit Stackup

FIG. 8 illustrates an exploded side section view A-A of an example flexible printed circuit implementation of printed circuit 700, according to some embodiments. Section A-A is taken in the direction of section lines and arrows A-A in FIG. 7. From top to bottom: the first layer in the stackup is processing system 110A (which may be implemented as an ASIC); the second layer in the stackup is coverlay 820; the third layer in the stackup is a conductive layer where routing traces 460 and 470 are disposed; the forth layer of the stackup is core material 830; the fifth layer of the stackup is another conductive layer where parallel conductor 634 is disposed; and the sixth layer of the stackup is coverlay 850. It should be appreciated that this is a high-level depiction and that many variations are possible. This stackup has been provided to illustrate the substantially parallel nature and overlapping nature of parallel conductor 634 with respect to routing traces 460 and 470. As can be seen, their substantially parallel orientation and separation permits a printed circuit capacitive coupling ($C_{PRT\_CIR}$) to exist between parallel conductor 634 and each of routing traces 460 and 470. Similar printed circuit capacitive couplings exist between other illustrated parallel conductors (431, 432, 533) and the respective routing traces that each overlaps. It is appreciated that a similar stackup may be implemented in other types of printed circuits, including, but not limited to printed circuit boards and lithographically printed circuits.

The conductor which overlaps the routing traces (e.g. the "parallel conductor") is often referred to herein as being parallel with the overlapped routing trace(s) because it is separated from the routing traces by a more or less uniform distance due to presence of one or more intermediate layers for some span along the overlapped routing trace(s). However, it should be appreciated that there may be some variation in one or more of the thicknesses of these intermediate layers, in the thickness of the one or more overlapped routing traces, and the thickness of the conductive layer. These variations may occur, for example, due to limitations of materials, due to variations in manufacturing, or for other reasons. Such small deviations may result in the "parallel conductor" only being "substantially parallel" to some or all of the overlapped routing traces. Such small deviations are expected and do not materially impact the techniques that are described herein for offsetting capacitance using a printed circuit, and for all intents the terms parallel and substantially parallel may be used interchangeably.

Description of Some Example Charge Offsetting Techniques

Figure 9A:
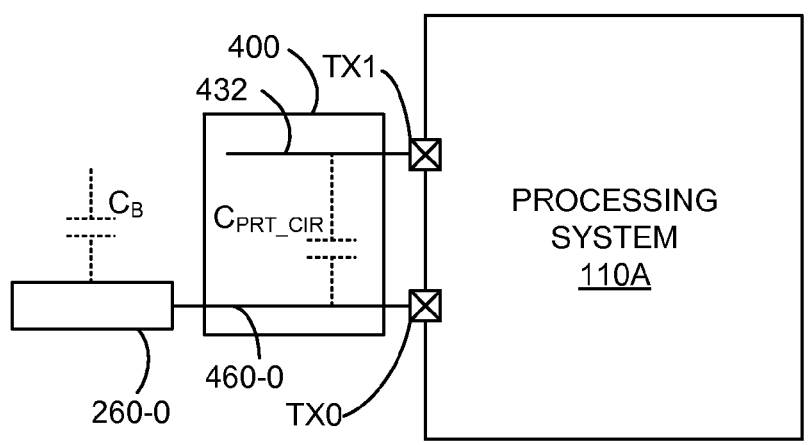
FIG. 9A shows a circuit diagram of a portion of a processing system coupled with a sensor electrode by a printed circuit, according to some embodiments.

FIG. 9A shows a circuit diagram 900A of a portion of a processing system 110A coupled with a sensor electrode by a printed circuit, according to some embodiments. When conducting absolute capacitive sensing, sensor electrode 260-0 is driven with an absolute capacitive sensing signal through a coupling, via routing trace 460-0, to a transmitter pin, such as TX0. At the same time, a parallel conductor, such as parallel conductor 432, which overlaps routing trace 460-0 in a different layer of printed circuit 400 may be driven with an over guarding offsetting signal through a coupling of parallel conductor 432 to a transmitter pin, such as TX1. In this manner, via capacitive coupling $C_{PRT\_CIR}$, a portion of the baseline capacitance, $C_B$, is offset (subtracted) external to processing system 110A. In some embodiments, external charge subtraction can be used as the only means of charge subtraction. In other embodiments, one example of which is illustrated in FIG. 9B, one or mechanisms of internal charge subtraction may be utilized in conjunction with external charge subtraction during absolute capacitive sensing.

Figure 9B:
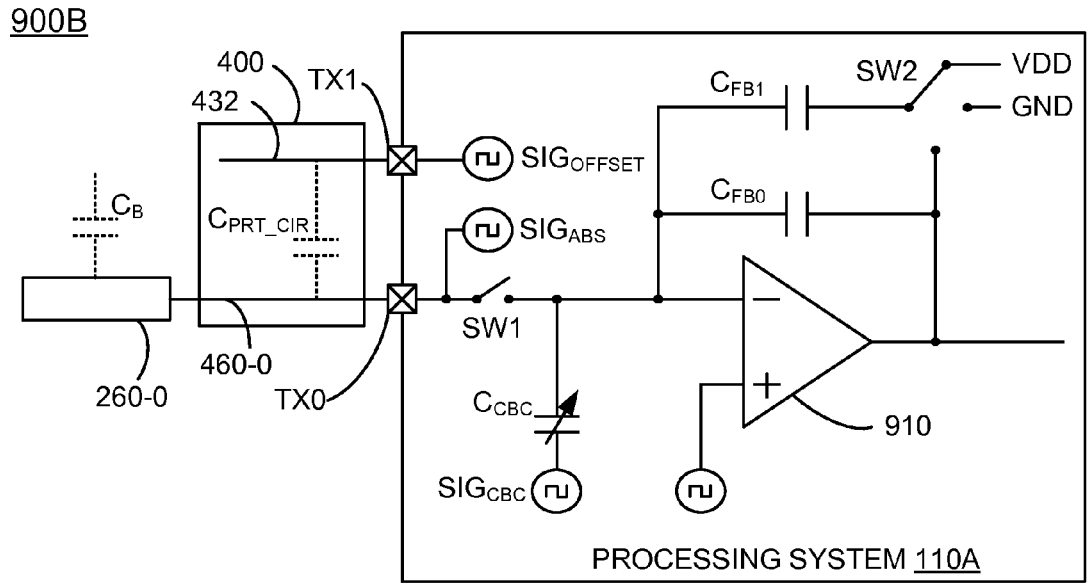
FIG. 9B shows a circuit diagram of a portion of a processing system coupled with a sensor electrode by a printed circuit, according to some embodiments.

FIG. 9B shows a circuit diagram 900 of a portion of a processing system 110A coupled with a sensor electrode by a printed circuit, according to some embodiments. The depicted portion of processing system 100A includes a differential amplifier 910 which has its inverting input coupled to sensor electrode 260-0 through selectable switch SW1. A selectable voltage may be modulated or set (e.g. VDD/2) on the non-inverting input of amplifier 910. Feedback capacitor $C_{FB0}$ is coupled between the output and the inverting input of amplifier 910. A first side of feedback capacitor $C_{FB1}$ is coupled with the inverting input of amplifier 910, while a second side of capacitor $C_{FB1}$ is coupled through selectable switch SW2 to VDD, ground, or the output of amplifier 910. When included, CFB1 may be pre-charged to ground or VDD prior to being coupled with the output of amplifier 910 as one mechanism of charge offset which is internal to processing system 100A. A coarse baseline correction capacitor, $C_{CBC}$, is coupled to the inverting input of amplifier 910 and may be both adjusted in capacitance value and driven with an adjustable signal, $SIG_{CBC}$, such that a charge coupled from sensor electrode 260-0 may be offset by a selected amount. When included, $C_{CBC}$ provides a mechanism of charge offset which is internal to processing system 100A. When conducting absolute capacitive sensing, sensor electrode 260-0 is driven with an absolute capacitive sensing signal, $SIG_{ABS}$, through a coupling via routing trace 460-0 to a transmitter pin, such as TX0. At the same time, a parallel conductor, such as parallel conductor 432, which overlaps routing trace 460-0 in a different layer of printed circuit 400 may be driven with an over guarding offsetting signal through a coupling of parallel conductor 432 to a transmitter pin, such as TX1. In this manner, via capacitive coupling $C_{PRT\_CIR}$, a portion of the baseline capacitance, $C_B$, is offset (subtracted) external to processing system 110A.

While two mechanisms of internal charge subtraction have been illustrated in FIG. 9B, it should be appreciated that external charge subtraction (via $C_{PRT\_CIR}$) can be in combination with either or both of these mechanisms or with one or more of these and other internal charge subtraction mechanisms.

Comparison of Some Example Signals

Figure 10:
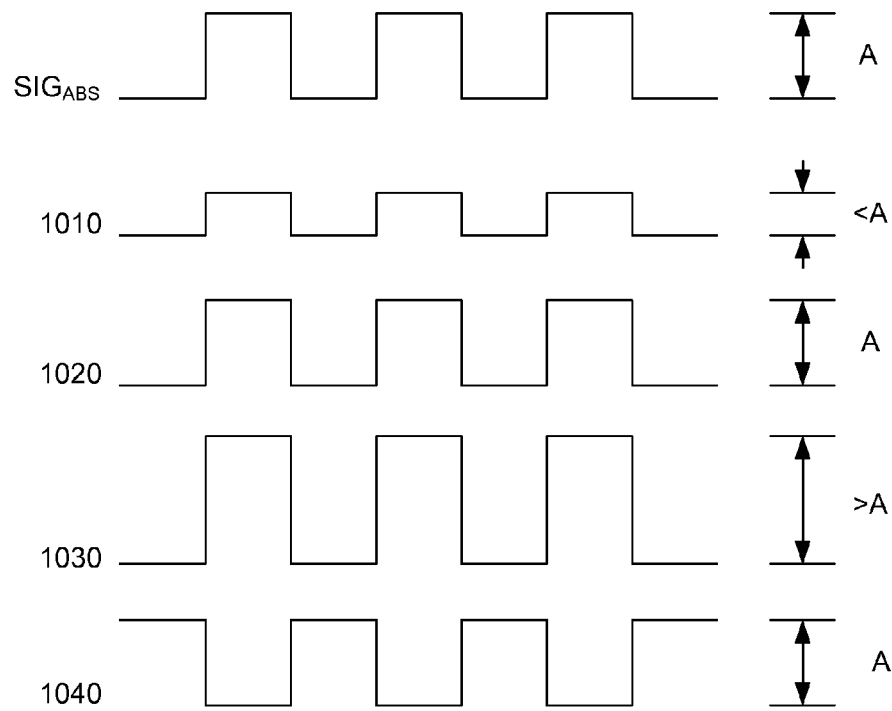
FIG. 10 illustrates a comparison of some example signals which may be used in various embodiments.

FIG. 10 illustrates a comparison of some example signals which may be used in various embodiments. A modulated absolute capacitive sensing signal, $SIG_{ABS}$, with amplitude A is illustrated for comparison purposes. Signal 1010 is an example of an under guarding signal and is in-phase with, but of lesser amplitude than, $SIG_{ABS}$. Signal 1020 is an example of a guarding signal and is in-phase with and has the same amplitude as $SIG_{ABS}$. Signal 1030 is an example of an over guarding signal and is in-phase with, but of greater amplitude than, $SIG_{ABS}$. Signal 1040 is an example of an anti-guarding signal and has the same amplitude as $SIG_{ABS}$, but is 180 degrees out of phase.

Example Methods of Operation

Figure 11B:
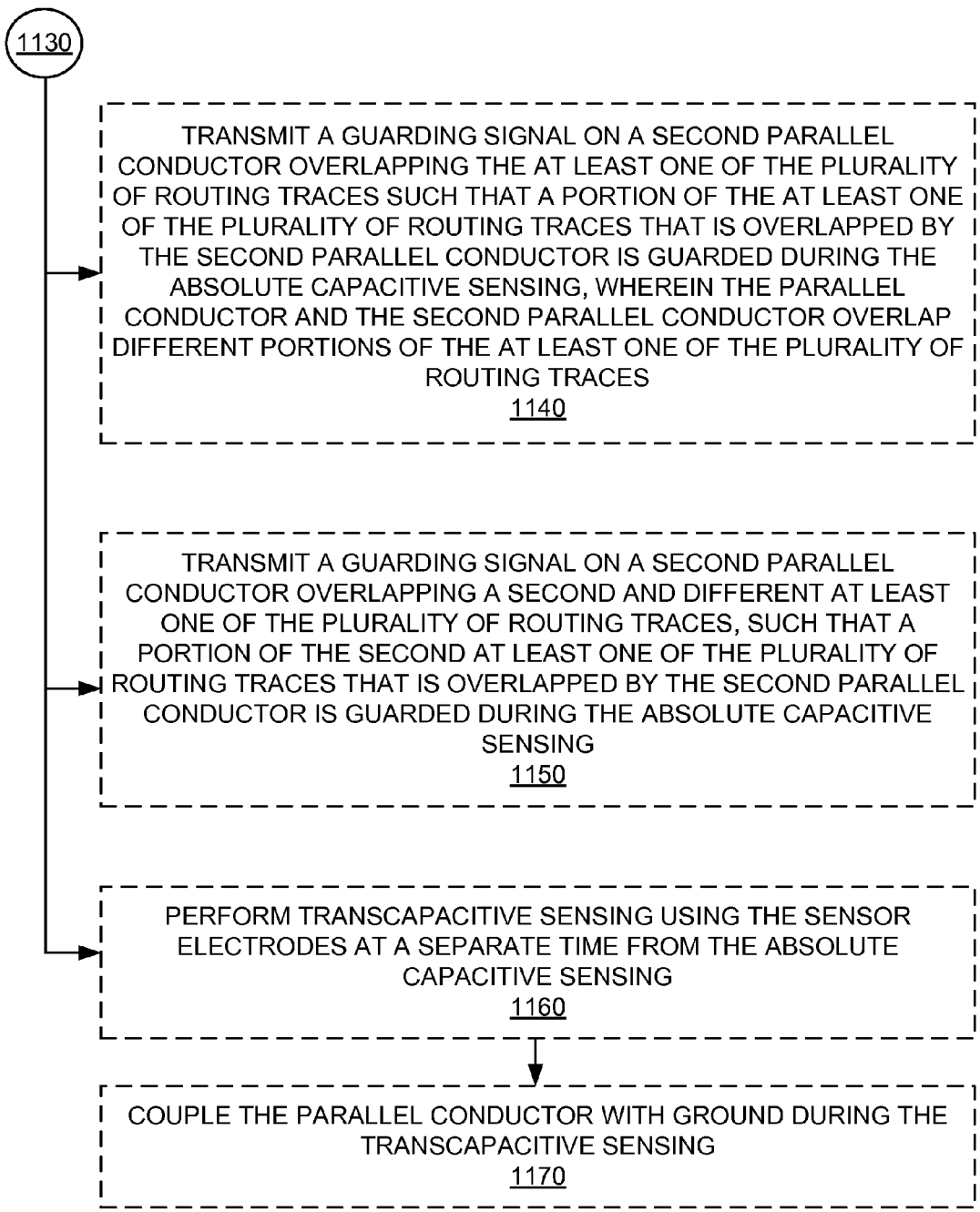

FIGS. 11A and 11B illustrate a flow diagram 1100 of a method of capacitive sensing, according to various embodiments. Procedures of this method will be described with reference to elements and/or components of one or more of FIGS. 1-10. It is appreciated that in some embodiments, the procedures may be performed in a different order than described, that some of the described procedures may not be performed, and/or that one or more additional procedures to those described may be performed.

With reference to FIG. 11A, at procedure 1110 of flow diagram 1100, in one embodiment, an absolute capacitive sensing signal is through at least one of a plurality of routing traces of a printed circuit. In various embodiments, the printed circuit may be a flexible printed circuit, a printed circuit board, a lithographically printed circuit, or another printed circuit that a routing trace in one layer of a stackup and a conductive layer in another layer of a stackup which is separated from the routing trace by an insulating material. In one embodiment, this comprises sensor module 310 of processing system 110A driving a transmitter signal (also referred to as an absolute capacitive sensing signal) through a routing trace (e.g., routing trace 460-0) of a plurality of routing traces 460, 470 to a sensor electrode (e.g., sensor electrode 260-0) of a sensor electrode pattern (e.g., sensor electrode pattern 200).

With continued reference to FIG. 11A, at procedure 1120 of flow diagram 1100, in one embodiment, absolute capacitive sensing is performed with at least one sensor electrode of a plurality of sensor electrodes in a sensor electrode pattern, wherein the at least one sensor electrode is coupled with the at least one of said plurality of routing traces. Following along with the previous example, in one embodiment, processing system 110A performs absolute capacitive sensing with sensor electrode 260-0 of sensor electrode pattern 200.

With continued reference to FIG. 11A, at procedure 1130 of flow diagram 1100, in one embodiment, an offsetting signal is transmitted on a parallel conductor overlapping the at least one of the plurality of routing traces, such that charge is offset from the at least one of the plurality of routing traces during the absolute capacitive sensing. Following the previous example, in one embodiment, sensor module 310 transmits an offsetting signal on parallel conductor 432 which overlaps routing trace 460-0 in order to offset (subtract) some background capacitance (which is part of the baseline capacitance) measured on sensor electrode 260-0. This offsetting signal is in-phase with the absolute capacitive sensing signal, and is of greater signal level (greater amplitude) than the amplitude of the absolute capacitive sensing signal.

With reference to FIG. 11B, as illustrated in procedure 1140 of flow diagram 1100, in some embodiments, the method as described in 1110-1130 further comprises transmitting a guarding signal on a second parallel conductor overlapping the at least one of the plurality of routing traces, such that a portion of the at least one of the plurality of routing traces that is overlapped by the second parallel conductor is guarded during the absolute capacitive sensing. The parallel conductor and the second parallel conductor overlap different portions of the at least one of the plurality of routing traces. Following the example that is included in description of procedure 1130, and with reference to FIG. 7, in some embodiments, sensor module 310 transmits a guarding signal on parallel conductor 634 which overlaps a different portion of routing trace 460-0 than the portion which is overlapped by parallel conductor 432.

With continued reference to FIG. 11B, as illustrated in procedure 1150 of flow diagram 1100, in some embodiments, the method as described in 1110-1130 further comprises transmitting a guarding signal on a second parallel conductor overlapping a second and different at least one of the plurality of routing traces, such that a portion of the second at least one of the plurality of routing traces that is overlapped by the second parallel conductor is guarded during the absolute capacitive sensing. Following the example that is included in description of procedure 1130, and with reference to FIGS. 4 and 7, in some embodiments, sensor module 310 transmits a guarding signal on parallel conductor 431 which overlaps a second and different one (e.g., routing trace 470-0) of the plurality of routing traces 460, 470.

With continued reference to FIG. 11B, as illustrated in procedure 1160 of flow diagram 1100, in some embodiments, the method as described in 1110-1130 further comprises performing transcapacitive sensing using the sensor electrodes. The transcapacitive sensing is performed at a separate and different time from the absolute capacitive sensing. Following the example that was presented in description of procedures 1110-1130, in one embodiment, this comprises sensor module 310 performing transcapacitive sensing using sensor electrodes of sensor electrode pattern 200.

With continued reference to FIG. 11B, at procedure 1170 of flow diagram 1100, in one embodiment, the parallel conductor is coupled with ground during the transcapacitive sensing. Following the example that was presented in description of procedures 1110-1130 and 1160, in one embodiment, this comprises sensor module 310 coupling parallel conductor 432 with ground. It should be appreciated that additional parallel conductors may also be coupled with ground.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed.

What is claimed is:

1. A method of capacitive sensing, said method comprising:
    driving an absolute capacitive sensing signal through at least one of a plurality of routing traces of a printed circuit;
    performing absolute capacitive sensing with at least one sensor electrode of a plurality of sensor electrodes in a sensor electrode pattern, wherein said at least one sensor electrode of said plurality of said sensor electrodes is coupled with said at least one of said plurality of said routing traces; and
    transmitting an offsetting signal on a first parallel conductor, wherein said first parallel conductor overlaps said at least one of said plurality of said routing traces longitudinally over a span where said first parallel conductor and said plurality of said routing traces run in parallel with one another but does not overlap any of said plurality of said sensor electrodes, such that charge is offset from said at least one of said plurality of said routing traces during said absolute capacitive sensing; and
    transmitting a guarding signal on a second parallel conductor, wherein said second parallel conductor overlaps at least one of said plurality of said routing traces longitudinally over a span where said second parallel conductor and said at least one of said plurality of said routing traces run in parallel with one another but does not overlap any of said plurality of said sensor electrodes, such that a portion of said at least one of said plurality of said routing traces that is overlapped by said second parallel conductor is guarded during said absolute capacitive sensing, and
    wherein said first parallel conductor and said second parallel conductor overlap different portions of the same said at least one of said plurality of said routing traces.

2. The method as recited in claim 1, wherein said transmitting said offsetting signal on said first parallel conductor such that charge is offset from said at least one of said plurality of said routing traces during said absolute capacitive sensing comprises:
    transmitting said offsetting signal as an in-phase signal to said absolute capacitive sensing signal.

3. The method as recited in claim 2, wherein said transmitting said offsetting signal as said in-phase signal to said absolute capacitive sensing signal comprises:
    setting the amplitude of said offsetting signal at a level greater than the amplitude of said absolute capacitive sensing signal.

4. The method as recited in claim 1, further comprising:
    performing transcapacitive sensing using said plurality of said sensor electrodes at a separate time from said absolute capacitive sensing; and
    coupling said first parallel conductor with ground during said transcapacitive sensing.

5. A processing system comprising:
    a sensor module configured to:
        drive an absolute capacitive sensing signal through at least one of a plurality of routing traces on a printed circuit to perform absolute capacitive sensing with at least one sensor electrode of a plurality of sensor electrodes in a sensor electrode pattern, wherein said at least one sensor electrode is coupled with said at least one of said plurality of routing traces; and transmit an offsetting signal on a first parallel conductor, wherein said first parallel conductor overlaps said at least one of said plurality of routing traces longitudinally over a span where said first parallel conductor and said plurality of said routing traces run in parallel with one another but does not overlap any of said sensor electrodes, such that charge is offset from said at least one of said plurality of said routing traces during said absolute capacitive sensing;

transmit a guarding signal on a second parallel conductor, wherein said second parallel conductor overlaps said at least one of plurality of routing traces longitudinally over a span where the second parallel conductor and said plurality of said routing traces run in parallel with one another but does not overlap any of said sensor electrodes, such that a portion of said at least one of said plurality of said routing traces that is overlapped by said second parallel conductor is guarded during said absolute capacitive sensing, and wherein said first parallel conductor and said second parallel conductor overlap different portions of the same said at least one of said plurality of said routing traces; and a determination module configured to determine input within a sensing region of said plurality of said sensor electrodes based on said absolute capacitive sensing.

6. The processing system of claim 5, wherein said sensor module is further configured to:

perform transcapacitive sensing using said sensor electrodes at a separate time from said absolute capacitive sensing; and couple said first parallel conductor with ground during said transcapacitive sensing; and wherein said determination module is further configured to determine input within a sensing region of said plurality of said sensor electrodes based on said transcapacitive sensing.

7. The processing system of claim 5, wherein said sensor module is configured to transmit said offsetting signal as an in-phase signal to said absolute capacitive sensing signal.

8. The processing system of claim 7, wherein said sensor module is configured to set the amplitude of said offsetting signal at a level greater than the amplitude of said absolute capacitive sensing signal such that charge is offset from said plurality of said routing traces.

9. A capacitive sensing input device, said capacitive sensing input device comprising:

a sensor electrode pattern comprising a plurality of sensor electrodes;

a processing system configured to operate said plurality of sensor electrodes to perform absolute capacitive sensing; and a printed circuit comprising:

a first plurality of routing traces and a second plurality of routing traces configured to communicatively couple signals between said plurality of sensor electrodes and said processing system;

a first parallel conductor, wherein said first parallel conductor overlaps said first plurality of said routing traces longitudinally over a span where said first parallel conductor and said first plurality of said routing traces run in parallel with one another but does not overlap any of said plurality of sensor electrodes, said first parallel conductor coupled with said processing system and configured to offset charge from said first plurality of said routing traces during said absolute capacitive sensing; and a second parallel conductor, wherein said parallel conductor overlaps said second plurality of said routing traces longitudinally over a span where said second parallel conductor and said second plurality of said routing traces run in parallel with one another but does not overlap any of said plurality of sensor electrodes, said second parallel conductor coupled with said processing system and configured to guard said second plurality of said routing traces with an in-phase signal of substantially the same amplitude as signals transmitted on said plurality of said routing traces during said absolute capacitive sensing, and wherein said first parallel conductor overlaps said first plurality of said routing traces at different locations than said second parallel conductor overlaps said second plurality of said routing traces.

10. The input device of claim 9, wherein said first plurality of said routing traces and said second plurality of said routing traces share no routing traces in common.

11. The input device of claim 9, wherein said processing system is further configured to:

couple said first parallel conductor with an in-phase signal to signals transmitted on said first plurality of said routing traces during said absolute capacitive sensing.

12. The input device of claim 11, wherein the amplitude of said in-phase signal is greater than the amplitudes of signals on said first plurality of said routing traces.

13. The input device of claim 9, wherein said processing system is further configured to:

operate said plurality of said sensor electrodes to perform transcapacitive sensing; and couple said first parallel conductor with ground during said transcapacitive sensing.

14. The input device of claim 9, wherein said first parallel conductor overlaps each of said first plurality of routing traces for substantially the same length.

15. The input device of claim 9, wherein said first parallel conductor overlaps a first routing trace and a second routing trace of said first plurality of routing traces for different lengths.

16. A capacitive sensing input device, said capacitive sensing input device comprising:

a sensor electrode pattern comprising a plurality of sensor electrodes;

a processing system configured to operate said plurality of said sensor electrodes to perform absolute capacitive sensing; and a printed circuit comprising:

a first plurality of said routing traces and a second plurality of said routing traces configured to communicatively couple signals between said plurality of said sensor electrodes and said processing system;

a first parallel conductor, wherein said first parallel conductor overlaps said first plurality of said routing traces longitudinally over a span where said first parallel conductor and said first plurality of said routing traces run in parallel with one another but does not overlap any of said plurality of said sensor electrodes, said first parallel conductor coupled with said processing system and configured to offset charge from said first plurality of said routing traces during said absolute capacitive sensing; and a second parallel conductor, wherein said parallel conductor overlaps said second plurality of said routing traces longitudinally over a span where said second parallel conductor and said second plurality of said routing traces run in parallel with one another but does not overlap any of said plurality of said sensor electrodes, said second parallel conductor coupled with said processing system and configured to guard said second plurality of said routing traces with an in-phase signal of substantially the same amplitude as signals transmitted on said first plurality of said routing traces during said absolute capacitive sensing, and wherein said first plurality of said routing traces and said second overlapped plurality of said routing traces share at least some routing traces in common.

* * * * *